(12) United States Patent
Gradl et al.

(10) Patent No.: US 6,385,252 B1
(45) Date of Patent: May 7, 2002

(54) HIGH DENSITY MULTIPLE DIGITAL SIGNAL CONNECTION INTERFACE WITH REDUCED CROSS TALK

(75) Inventors: David A. Gradl, Naperville, IL (US); Michael L. Steinberger, Woodenville, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/322,613

(22) Filed: May 28, 1999

(51) Int. Cl.$^7$ ................................................. H04B 3/00
(52) U.S. Cl. ....................... 375/257; 375/220; 333/124; 333/17.3; 370/463
(58) Field of Search ................................ 375/257, 220, 375/222, 377; 370/463; 333/124, 12, 17.3, 260, 32; 439/660, 682, 692; 710/131

(56) References Cited

U.S. PATENT DOCUMENTS 5,754,588 A * 5/1998 Tanaka ........................ 375/222
5,816,832 A * 10/1998 Aldous et al. .............. 439/131
6,014,386 A * 1/2000 Abraham .................... 370/485

* cited by examiner

Primary Examiner—Chi Pham
Assistant Examiner—Dung X. Nguyen (74) Attorney, Agent, or Firm—Walter W. Duft (57) ABSTRACT

A high speed digital signal connection interface with reduced cross talk includes a multiple pin connector with disconnectable header and receptacle portions. The header is attached to a first set of signal carrying wire pairs communicating with a first signal processing unit. The receptacle is attached to a second set of signal carrying wire pairs communicating with a second signal processing unit. Within each of the first and second wire pair sets is a first wire pair subset carrying digital signals travelling in a first direction between the signal processing units, and a second wire pair subset carrying digital signals travelling in a second direction between the signal processing units. The first and second wire pair sets are attached to the corrector such that adjacent pin pairs of the connector carry only signals travelling in the same direction and such that connector pin pairs carrying signals travelling in opposite directions are not adjacent to each other. An impedance matching circuit is provided for each signal-carrying wire pair of the first and second wire pair sets. Each impedance matching circuit has a first side connected to one of the signal processing units and a second side connected to one of the wire pairs at an impedance that substantially matches the wire pair impedance. The impedance matching circuits that connect to wire pairs carrying outgoing signals from a signal processing unit provide driver end impedance matching, and the impedance matching circuits that connect to wire pairs carrying incoming signals to a signal processing unit provide receiver end impedance matching.

21 Claims, 11 Drawing Sheets

```
X  X  X  X  X
•  A  B  X  X
•  A' B' X  X
X  X  X  X  X
X  X  X  X  X
```
ALIGNED PATTERN

FIG. 4A

```
X  X  X  X  X
X  A  X  X  X
X  A' B  X  X
X  X  B' X  X
X  X  X  X  X
X  X  X  X  X
```
STAGGERED PATTERN

HIGH DENSITY MULTIPLE DIGITAL SIGNAL CONNECTION INTERFACE WITH REDUCED CROSS TALK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to high density, high speed signal interconnections between circuit components in a digital system. More particularly, the invention concerns a high density connection interface for multiple high speed digital signal transmission lines that produces reduced cross talk between the adjacent signalling channels. Still more particularly, the invention is directed to the reduction of cross talk in high density signal interconnects made through back plane connectors with sub nano-second logic signal edge speeds.

2. Description of the Prior Art

In high speed digital signalling environments, wherein each signal is considered to be effectively transported on two electrically conductive elements (hereinafter referred to as "wire pairs"), interconnections between transmission media, such as the pin connections between back plane circuit boards and plug-in circuit cards, may produce significant cross talk between signal carrying pin pairs that are adjacent to one another. The traditional method of reducing connector cross-talk is to assign isolating (e.g., grounded) pins between each of the signal pin pairs. This dramatically reduces the number of pin pairs available for signals and limits interconnection density. Connectors with plural grounded conductive shields between the rows and columns of pin pairs are also available, but these are costly. Other cross-talk reduction methods involve increasing the rise time of the logic signals to reduce the degree of cross talk.

Although there are prior art digital communications systems wherein adjacent connector pin pairs are grouped on the basis of signal direction, and wherein impedance matching may be applied at the receiver end of each signal path to minimize reflections, such systems do not account for the directional nature of crosstalk from adjacent connector pins and therefore do not effectively compensate for it. A digital signal connection interface that effectively counteracts directional crosstalk interference would be desirable.

SUMMARY OF THE INVENTION

A high speed connection interface with driver end and receiver end impedance matching facilitates bi-directional digital signal communications with reduced cross talk between communicating digital signal processing units. In accordance with a preferred embodiment of the invention, a multiple pin connector includes disconnectable header and receptacle portions. The header is attached to a First set of signal carrying wire pairs communicating with a first signal processing unit. The receptacle is attached to a second set of signal carrying wire pairs communicating with a second signal processing unit. Within each of the first and second wire pair sets is a first wire pair subset carrying digital signals travelling in a first direction between the signal processing units, and a second wire pair subset carrying digital signals travelling in a second direction between the signal processing units, which is opposite to the first direction. The first and second wire pair sets are attached to the connector such that adjacent pin pairs of the connector carry only signals travelling in the same direction and such that connector pin pairs carrying signals travelling in opposite directions are not adjacent to each other. An impedance matching circuit is provided for each signal-carrying wire pair of the first and second wire pair sets. Each impedance matching circuit has a first side connected to one of the signal processing units and a second side connected to one of the wire pairs at an impedance that substantially matches the wire pair impedance. The impedance matching circuits that connect to wire pairs carrying outgoing signals from a signal processing unit provide driver end impedance matching. The impedance matching circuits that connect to wire pairs carrying incoming signals to a signal processing unit provide receiver end impedance matching.

DETAILED DESCRIPTION OF THE PREFERRED EMBODIMENT

Figure 1:
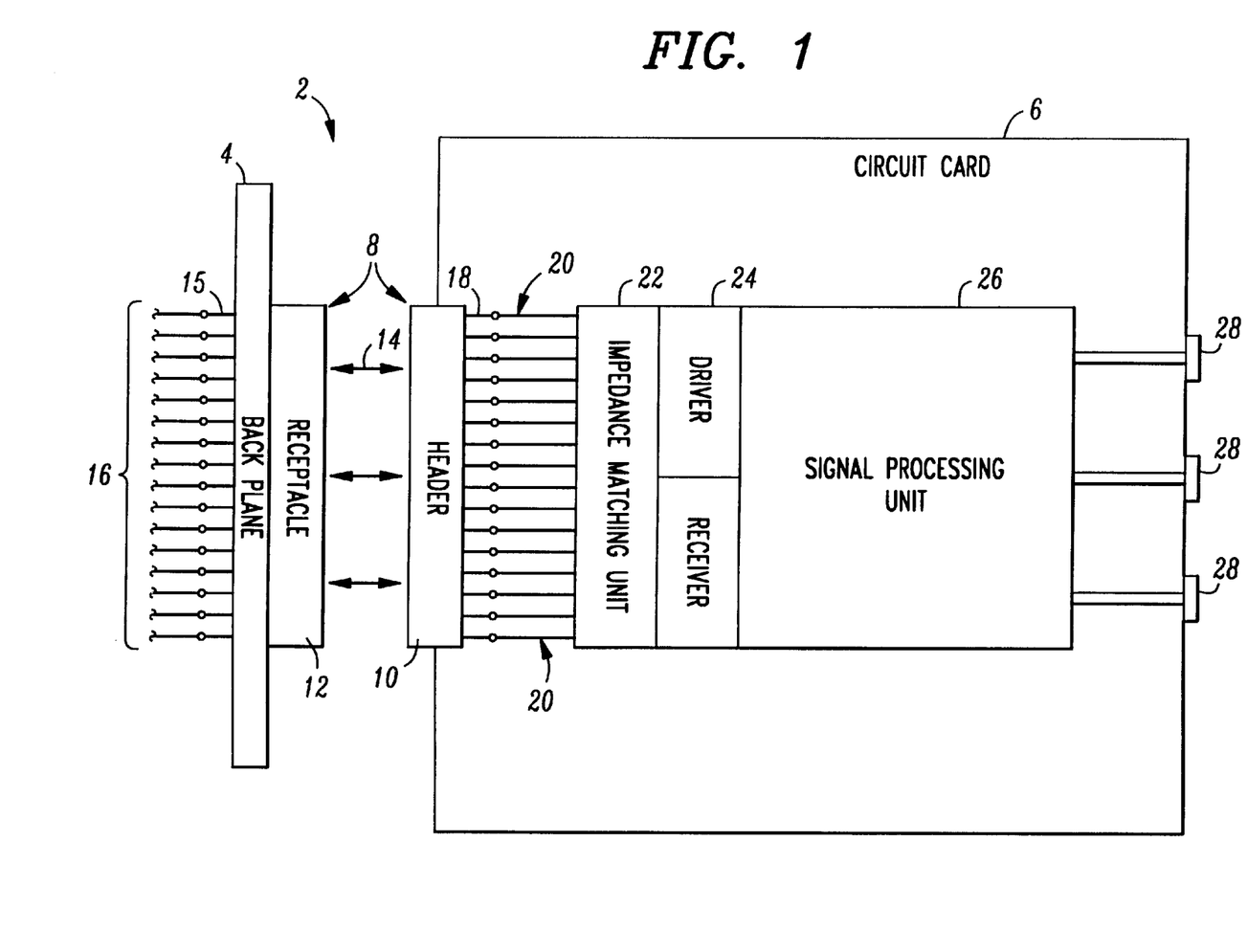
FIG. 1 is a block diagram showing a digital circuit card mounted to a backplane board using a connector configured in accordance with the invention.

Turning now to the figures, wherein like reference numerals represent like elements in all of the several views, FIG. 1 illustrates a high speed digital signal communications circuit pack 2 comprising a backplane board 4 connected to a circuit card 6 via a header/receptacle connector pair 8 hereinafter referred to as "connector"), and optionally, to other circuit cards (not shown) via additional connectors (not shown). As is commonly known, the backplane 4 and the connected circuit card(s) 6 forming the circuit pack 2 may be mounted on a shelf in a cabinet (not shown) comprising several shelves holding one or more other circuit packs of like construction.

The connector 8 is conventional in nature except for the manner in which the pins thereof are wired, as explained in more detail below. Thus, the connector 8 may comprise a standard 12×5-pin or 12×6-pin header 10 connected to a mating 12×5-slot or 12×6-slot receptacle 12. The header 10 and the receptacle 12 connect and disconnect by manipulating them in the direction of the arrows 14.

The receptacle 12 is mounted on the backplane 4 and has terminals or leads 15 that connect to a set of wire pairs 16 (sixteen wire pairs are shown). The header 10 is mounted to one end of the circuit card 6 and has terminals or leads 18 that connect to a plurality of wire pairs 20 (sixteen wire pairs are shown). Various implementation options for the wire pair sets 16 and 20 are described in more detail below.

The wire pair set 16 may ultimately connect to other circuit cards connected to the same backplane 4, to other backplanes, or to any other compatible circuitry. The wire pair set 20 connects to an impedance matching unit 22 containing an impedance matching circuit for each wire pair. The impedance matching unit 22 connects to a driver/receiver unit 24 which in turn connects to a digital signal processing unit 26. A first subset of the wire pair set 20 carries outgoing digital signals from the signal processing unit 26 and the driver side of the driver/receiver unit 24. A second subset of the wire pair set 20 carries incoming digital signals that are provided through the receiver side of the driver/receiver unit 24 to the signal processing unit 26. The wire pair set 16 is likewise divided into first and second wire pair subsets that respectively carry digital signals travelling in opposite directions. It should be further noted that in the high speed signalling environment of the present invention (see below), each wire pair in the wire pair sets 16 and 20 is considered to carry a single digital signal travelling in a single direction.

The signal processing unit 26 could be any of a variety of equipment, such as a high speed multiplexer/demultiplexer. It could communicate with other circuit pack components connected to the circuit card 6 through the back plane 4. It could also communicate with additional circuitry connected to the circuit card 6 through one or more interface ports 28 mounted at the end of the circuit card 6. The interface ports 28 could, by way of example, be plug-in connectors for high bandwidth serial data lines such as DS3 or fiber optic cabling.

In the exemplary embodiment of the invention described hereinafter, the circuit pack 2, including the signal processing unit 26, is designed to process high density, high speed, serial digital data on the order of 622 Mbits/second or better. To minimize high frequency attenuation and eliminate the need for equalization in this environment, the connections between the circuit pack 2 and other circuit packs of like construction are kept relatively short, for example, not more than about fifteen feet. The communications between circuit pack components are preferably implemented using Low Voltage Differential Signaling (LVDS) with +1.0/−1.4 volt logic levels. Differential Emitter Coupled Logic (ECL) or common mode signaling at 0–5 or 0–3.3 volts could also be used.

The wire pair sets 16 and 20 can be implemented using a variety of conventional signal carrying elements. By way of example only, each individual wire pair could be formed as a twisted wiring pair, a coaxial cable or a pair of circuit traces on the backplane 4 and circuit card 6. If a common mode signalling environment is used, there need not be two discrete wires for each wire pair. Rather, a common ground plane element can be used to provide the ground side of all of the wire pairs in a single wire pair set 16 or 20. In that configuration, there would be a single discrete signal wire associated with each digital signal and a common ground plane providing a shared ground for all of the signals. As used herein, the common mode, common ground configuration just described is considered to have plural wire pairs, notwithstanding that the ground element is shared.

Figure 2:
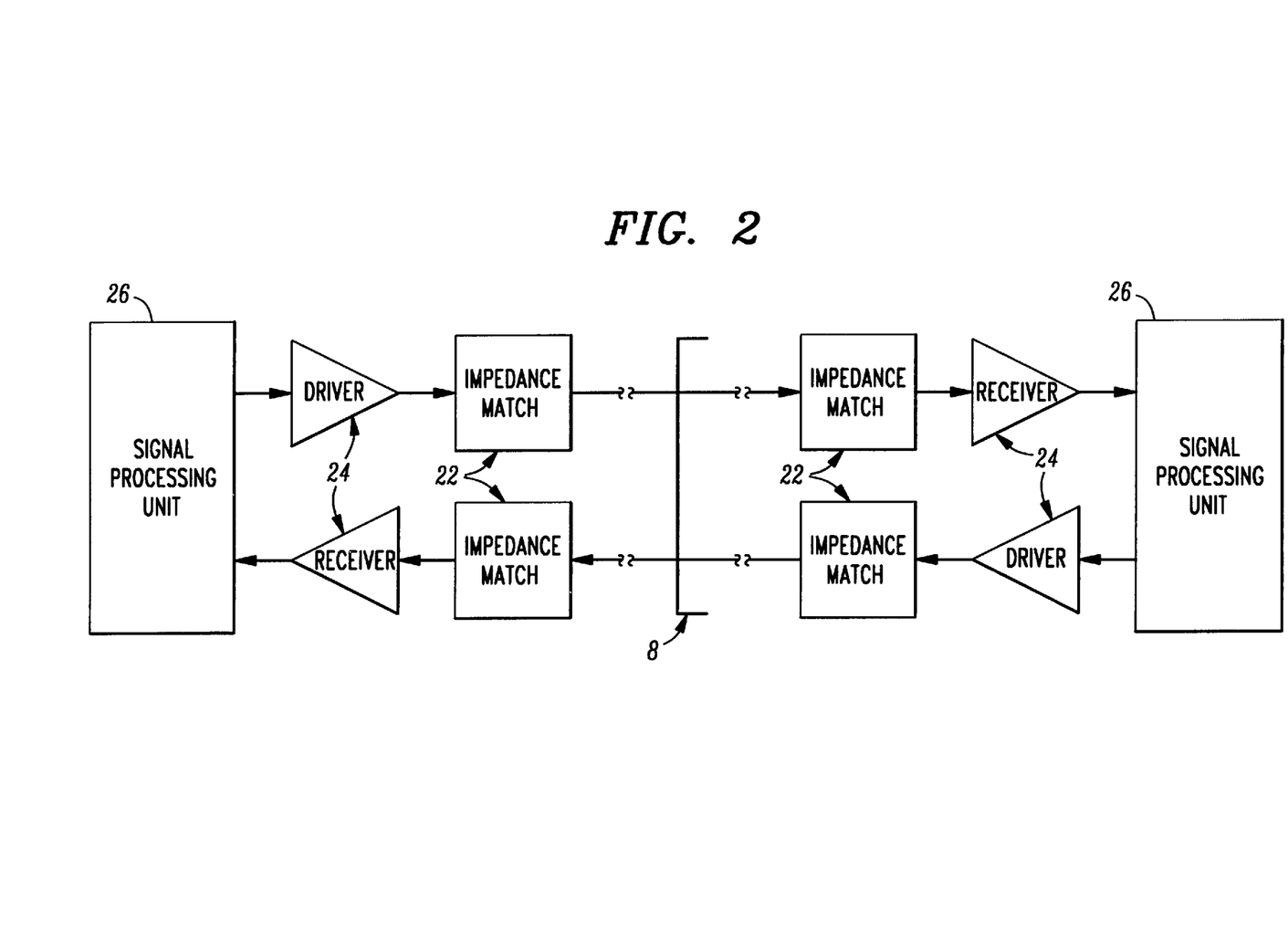
FIG. 2 is a block diagram illustrating connection paths between a pair of digital signal processing units in accordance with the invention.

Turning now to FIG. 2, two complete connection paths are shown between a pair of signal processing units 26, along with associated driver/receiver units 24 and impedance matching units 22. The connector 8 is also illustrated in schematic form.

It has been discovered through experiment that by employing impedance matching at the driver and receiver ends of the connection shown in FIG. 2, and by arranging the pins of the connector 8 such that adjacent pin pairs carry only signals travelling in the same direction, i.e., all incoming or all outgoing, a significant reduction in cross-talk interference can be achieved.

Figure 3:
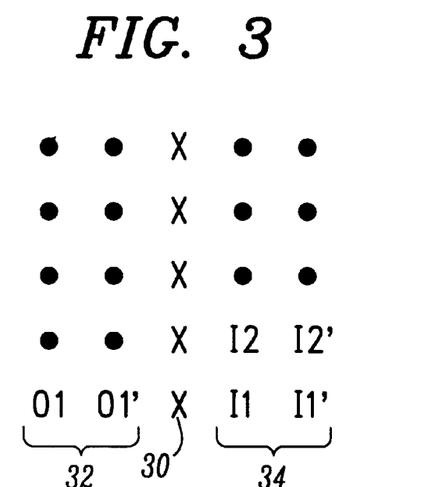
FIG. 3 is a diagrammatic view showing a first exemplary pin connection arrangement for a connector configured in accordance with the invention.
Figure 3A:
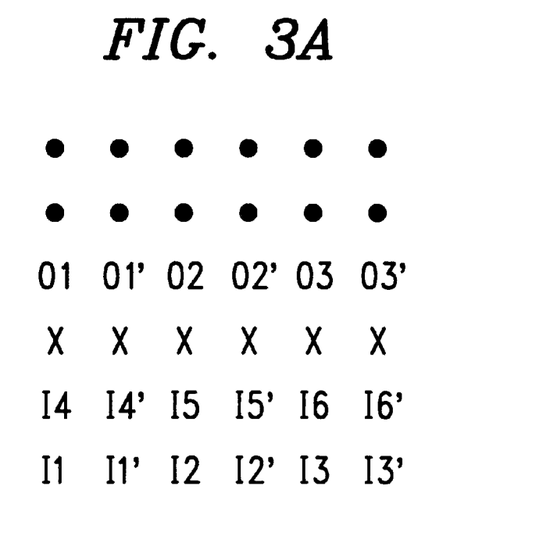
FIG. 3A is a diagrammatic view showing a second exemplary pin connection arrangement for a connector configured in accordance with the invention.

FIGS. 3 and 3A illustrate two exemplary pin connection arrangements that could be implemented in accordance with the invention. In both figures, the symbol "●" indicates an unconnected pin and the symbol "×" indicates a grounded pin. The symbols O1–O1', O2–O2' and O3–O3' represent pin pairs carrying outgoing signals relative to one of the signal processing units 26 (i.e., driver signals). The symbols I1–I1', I2–I2', I3–I3', I4–I4' and I5–I5' represent pin pairs carrying incoming signals relative to the same signal processing unit 26 (i.e., receiver signals).

FIG. 3 illustrates a 5×5-pin connection arrangement wherein a column of ground pins 30 separates an area 32 containing a pin pair O1–O1' (there could be more) carrying outgoing signals, from an area 34 containing adjacently arranged pin pairs I1–I1' and I2–I2' (there could be more (or less)) carrying incoming signals. FIG. 3A illustrates a 6×6pin connection arrangement wherein a row of ground pins 35 separates an area 36 containing adjacently arranged pin pairs O1–O1', O2–O2', O3–O3' (there could be more (or less)) carrying outgoing signals, from an area 38 containing adjacently arranged pin pairs I1–I1', I2–I2', I3–I3', I4–I4' and I5–I5' (there could be more (or less)) carrying incoming signals. Other pin connection arrangements that produce separate groups of adjacently arranged pin pairs, all carrying signals in the same direction, could also be used. The pin pair groups are preferably separated by ground pins, unconnected pins, shielding, or any other appropriate pin group isolating mechanism.

Verification that the foregoing pin arrangements are effective in reducing connector cross talk is provided in the examples below, which represent differential mode interference experiments conducted using the pin connection arrangements of FIGS. 4 and 4A, and three test circuits respectively illustrated in FIGS. 5, 8 and 10.

Figure 4:
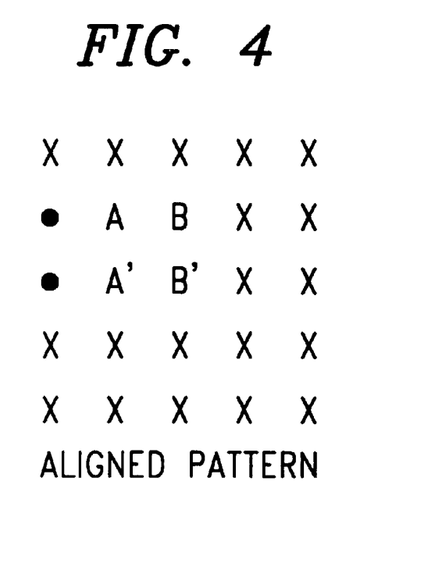
FIG. 4 is a diagrammatic view showing a first test pin connection arrangement for verifying the operation of the invention.
Figure 4A:
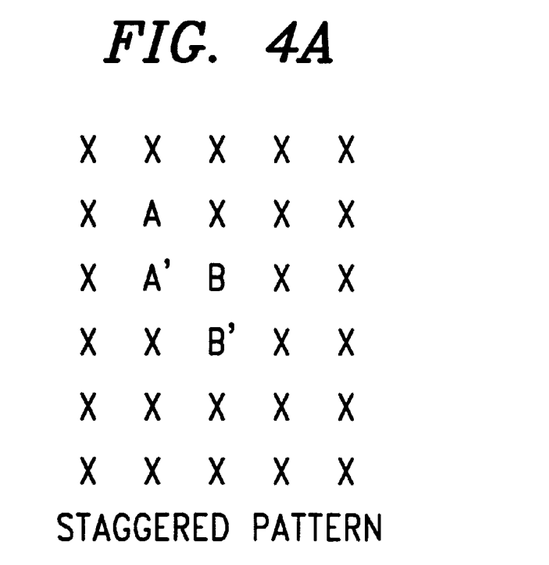
FIG. 4A is a diagrammatic view showing a second test pin connection arrangement for verifying the operation of the invention.

In both FIGS. 4 and 4A, the symbols A–A' represent a first pin pair carrying a first signal and the symbols B–B' represent a second pin pair carrying a second signal. In the experiments described below, the first and second signals were differential mode ECL level signals. The pins A–A' carried the positive and negative components of the first differential mode signal, respectively, and the pins B–B' carried the positive and negative components of the second differential mode signal, respectively. FIG. 4 illustrates a "non-staggered" arrangement wherein pins carrying differential signal components having the same sense (i.e., positive or negative) are positioned in orthogonally adjacent relationship. FIG. 4A illustrates a "staggered" arrangement wherein pins carrying differential signal components having the same sense are arranged in diagonally adjacent relationship.

Each of the connectors 8 of FIGS. 4 and 4A was conventional in nature. The connector 8 of FIG. 4, for example, was a METRAL™ 12×5-pin header/receptacle pair. The connector 8 of FIG. 4A was a METRAL™ 12×6-pin header/receptacle pair.

Figure 5:
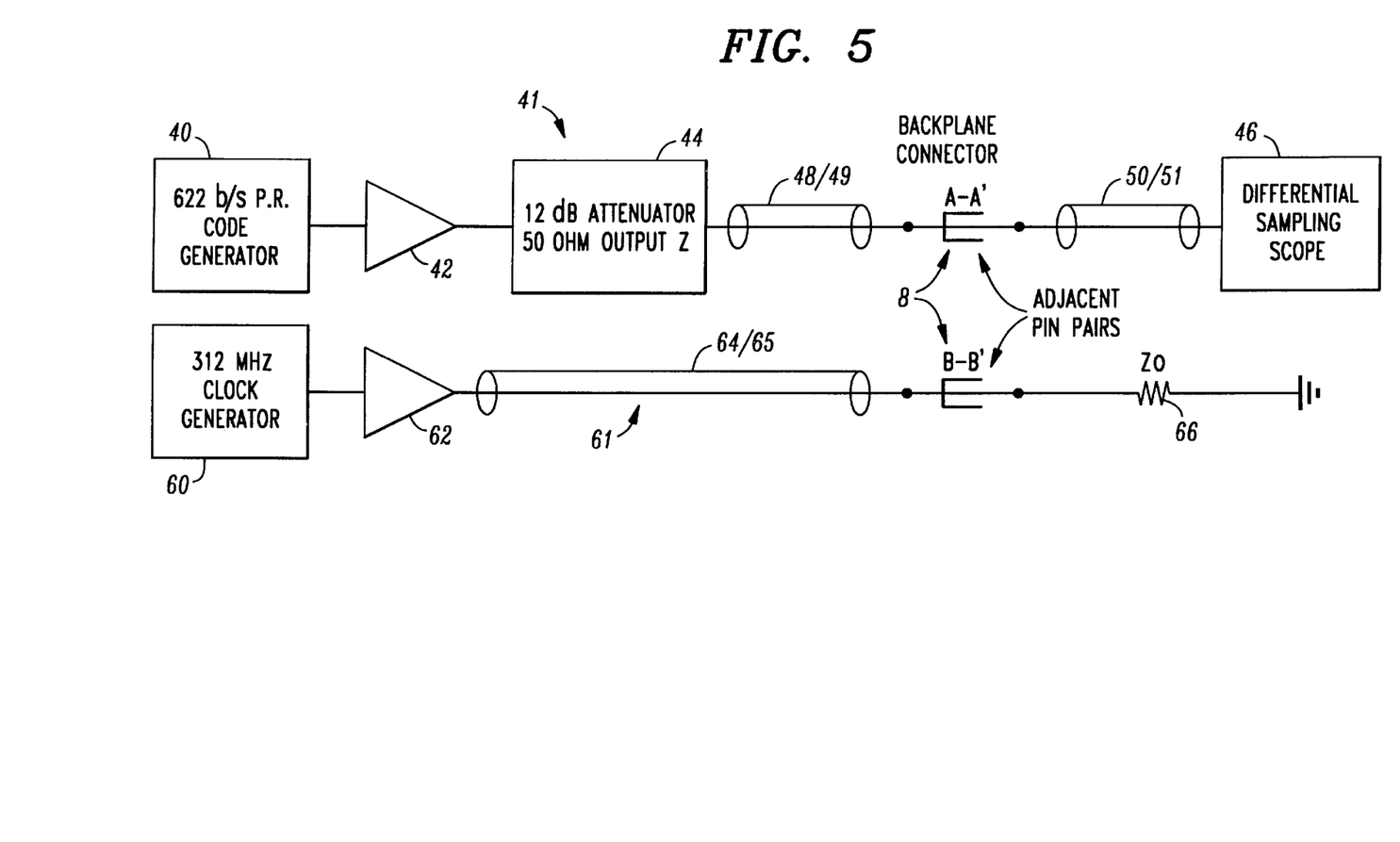
FIG. 5 is a block diagram showing a first test configuration for verifying the operation of the invention.
Figure 6:
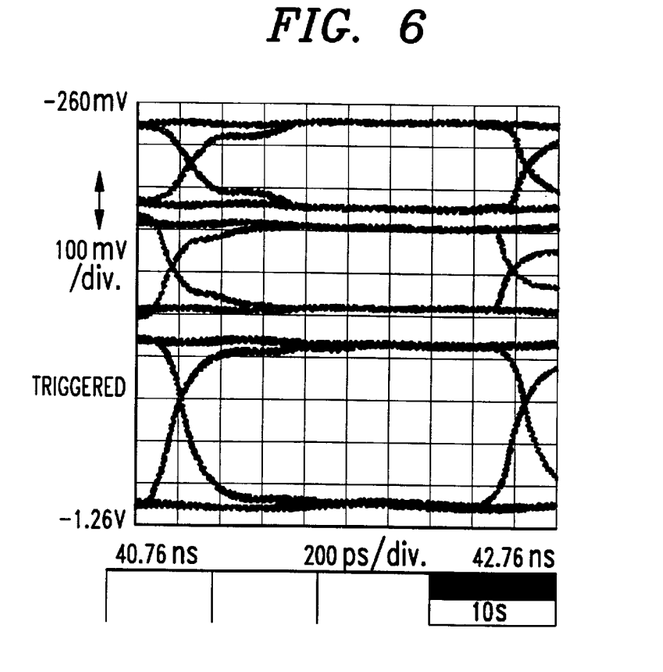
FIG. 6 is a graph representing an oscilloscope screen output generated by the first test configuration of FIG. 5 using the pin connection arrangement of FIG. 4, and without the presence of crosstalk interference.
Figure 7:
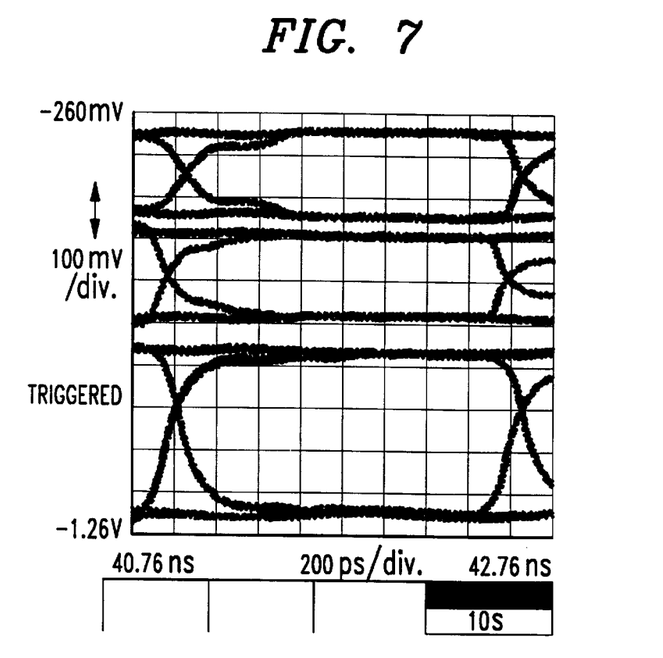
FIG. 7 is a graph representing an oscilloscope screen output generated by the first test configuration of FIG. 5 using the pin connection arrangement of FIG. 4, and with the presence of crosstalk interference.
Figure 8:
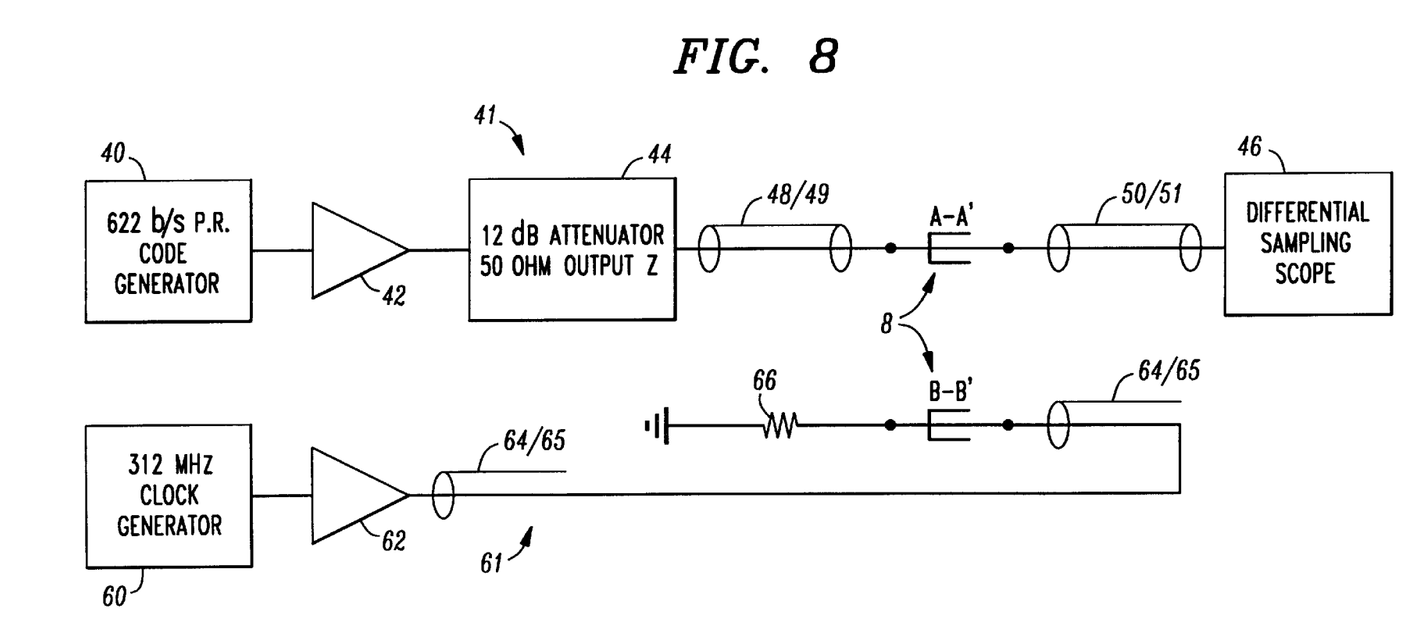
FIG. 8 is a block diagram showing a second test configuration for verifying the operation of the invention.
Figure 9:
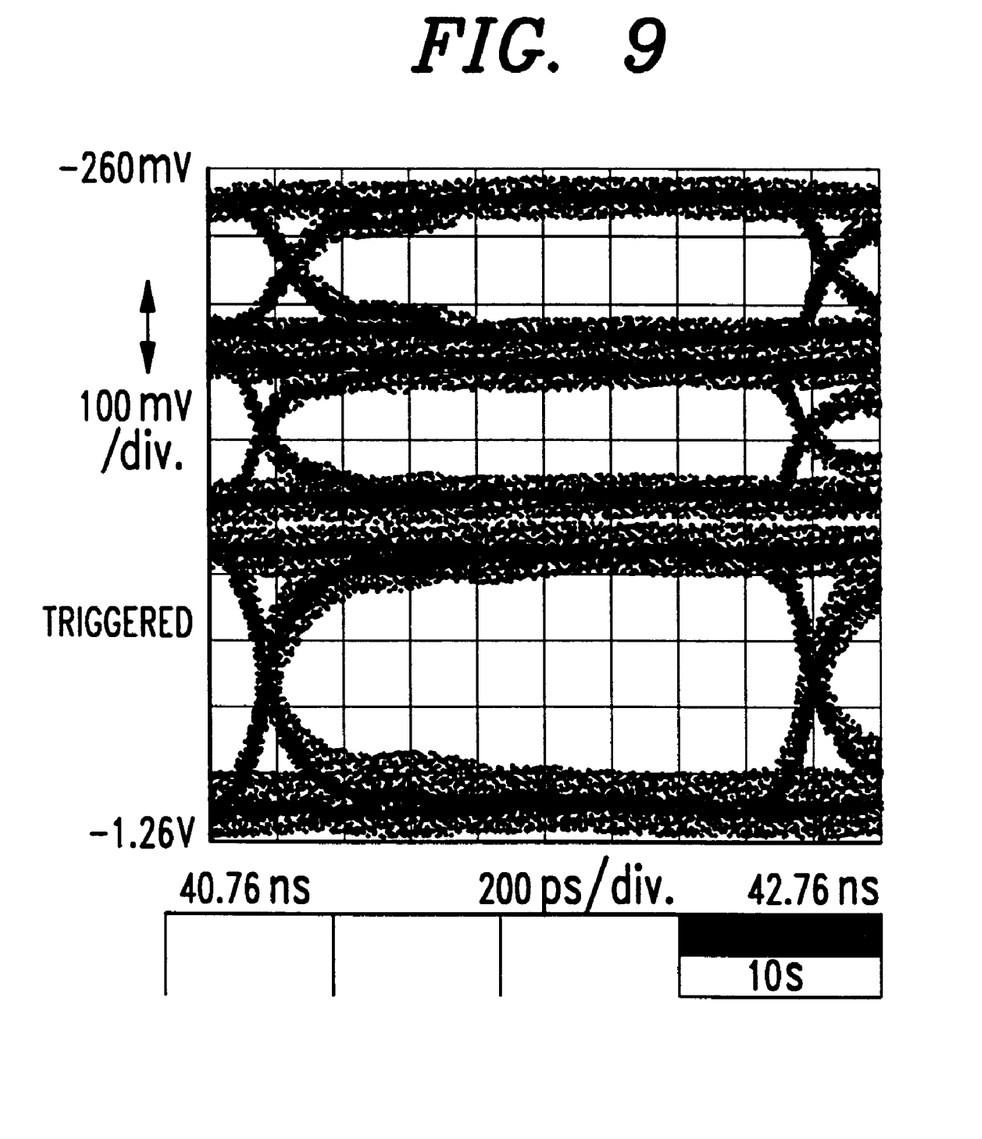
FIG. 9 is a graph representing an oscilloscope screen output generated by the second test configuration of FIG. 8 using the pin connection arrangement of FIG. 4, but with the B and B pins reversed, and with the presence of crosstalk interference.
Figure 10:
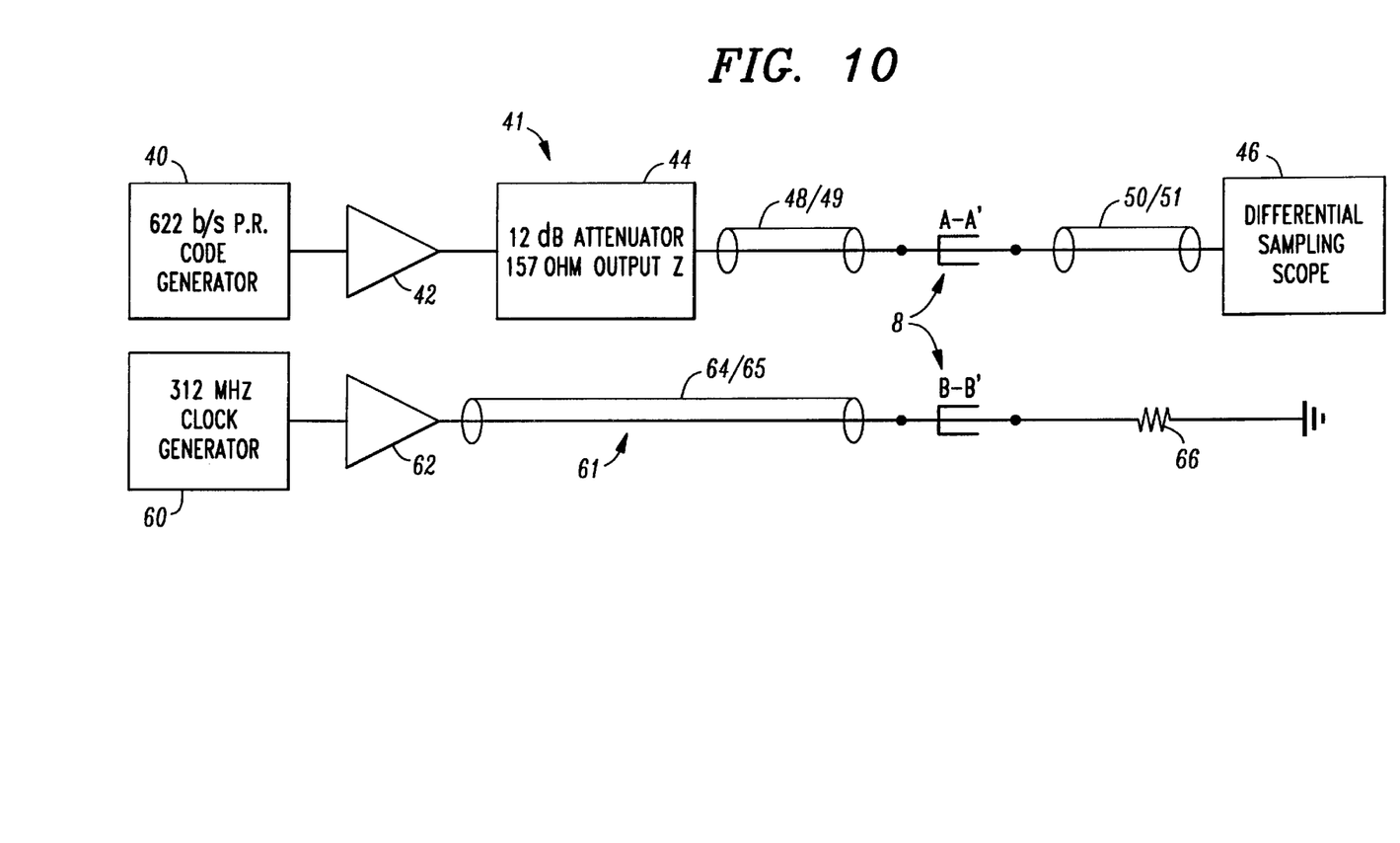
FIG. 10 is a block diagram showing a third test configuration for verifying the operation of the invention.

Turning now to FIGS. 5, 8 and 10, which represent test circuits used in the examples given below, a digital signal generator 40 was used to generate a 622 Mb/s pseudo-random digital coded signal for transmission on a data signal path 41. This signal was translated to differential ECL form by a MOTOROLA model 10EL16D ECL driver 42, then attenuated and impedance matched at an impedance matching/attenuation circuit 44, and passed through the pins of the header/receptacle connector 8. A differential sampling oscilloscope 46 provided an impedance matched termination at the receiver end of the data signal path 41. Two matched length pairs 48/49 and 50/51 of 50 ohm coaxial cables were used to connect the impedance matching/attenuation circuit 44 and the oscilloscope 46 to the header/receptacle connector 8, respectively. As shown in FIGS. 6, 7, 9, and 11–16, the oscilloscope 46 was set up to generate an eye-diagram display using data clock signal triggering and high display persistence (10 seconds). The eye diagrams represented a combination of common mode and differential mode voltage waveforms, for example, A with respect to ground, A' with respect to ground, and A with respect to A'.

A separate differential crosstalk (interference) signal injecting circuit was used for introducing a crosstalk signal into the data signal path 41. The interference injection circuit was constructed from a signal generator 60 for generating a 312 MHz clock signal for transmission on an interference signal path 61. This signal was driven by a MOTOROLA model 10EL16D ECL driver 62. A matched length pair of 50 ohm coaxial cables 64/65 were extended from the driver 62 to one side of the header/receptacle connector 8, and a 50 ohm resister 66 connected from the other side of the header/receptacle connector 8 to ground. The signals generated by the signal generators 40 and 60 were run differentially through the adjacent pin pairs A–A' and B–B' of the header/receptacle connector 8, as shown in FIGS. 4 and 4A.

The data signal path attenuation at the impedance matching/attenuation circuit 44 was set to 12 dB, providing a 400 mV differential signal level through the A–A' pins of the header/receptacle connector 8. The clock signal which provided the crosstalk interference was not attenuated and thus passed through the B–B' pins of the header/receptacle connector 8 at a 1600 mV differential level. This was done to simulate the total crosstalk that could occur from two adjacent signal paths in each of two backplane connectors. The factor of 4 increase represented a typical synchronous worst case addition of the interfering signals. Similarly, use of a clock interfering signal provided a maximum number of transitions and interference. The clock frequency was slightly offset (from a 1:2 ratio with the data signal rate) to create a constantly changing edge timing relationship between data signal and interference signal edges. This clock offset, combined with the long display persistence of the oscilloscope 46, provided a worst case eye-diagram, spanning many possible timing conditions.

In the examples below, the METRAL™ connectors were mounted on a small single layer Printed Wiring Board (PWB). This single layer PWB provided a ground connection to all unused pins in the connector block. In the non-staggered pin pattern arrangement of FIG. 4, short lengths of semi-rigid coaxial cable connected the A–A' pins to the impedance matching/attenuation circuit 44 and the oscilloscope 46, respectively, of the data signal path 41. Wire-over-groundplane transmission line segments (with wire pressed flat against the groundplane) were used to connect the interference signal path 61 to the pins B–B'. In the staggered pin pattern arrangement of FIG. 4A, wire-over-groundplane segments were used for all the pin connections.

The ECL differential drivers 42 and 62 of the data and interference signal paths 41 and 61, respectively, and the impedance matching/attenuation circuit 44 of the data signal path 41, were implemented on a separate 4 layer PWB with 50 ohm microstrip traces of controlled (matched) length. The differential drivers 42 and 62 generated balanced 200 to 300 pS edge speed signals.

Non-Staggered Pin Experiments

The first group of experiments was with a METRAL™ connector PWB that carried the differential mode data and interference signals through non-staggered pin pairs, as shown in FIG. 4. The direction of the interference signal through the connector PWB and the effective driver end impedance on the data signal path 41 were varied with three different test configurations, as will now be described relative to Examples 1, 2 and 3:

EXAMPLE 1

Referring now to FIG. 5, the test configuration of Example 1 provided a matched driver condition on the data signal path. The wire pairs 48/49 (and 50/51) of the data signal path 41, and the wire pairs 64/65 of the interference signal path 61, were attached to the connector PWB to provide a non-staggered pin pair relationship at A–A' and B–B' (as shown in FIG. 4). FIG. 6 shows the receiver end eye-diagram for the data signal path 41 with no interfering (crosstalk) signal presented by the adjacent interference signal path 61. FIG. 7 shows the receiver end eye-diagram for the data signal path 41 with the interfering signal presented through the adjacent interference signal path 61. As can be seen, there is only a slight degradation in the data signal.

EXAMPLE 2

Referring now to FIG. 8, the test configuration of Example 2 provided a matched driver condition, but the direction of interference signal flow through the connector PWB was reversed by reversing the header and receptacle connections. This provided an arrangement wherein the non-staggered pins of the connector PWB carried signals of opposite direction. FIG. 9 shows the resulting receiver end eye-diagram for the data signal path 41 with interference signals present on the interference signal path 61. As can be seen, there is significant eye closure indicating that the data signal has been seriously degraded.

EXAMPLE 3

Figure 11:
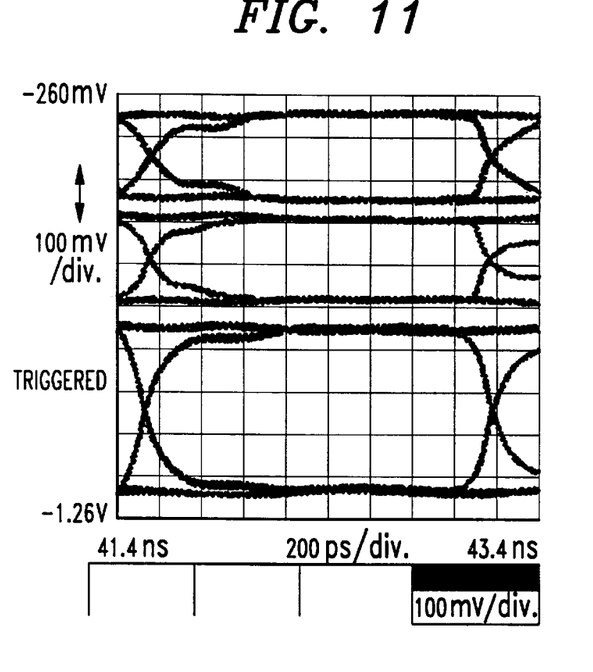
FIG. 11 is a graph representing an oscilloscope screen output generated by the third test configuration of FIG. 10 using the pin connection of FIG. 4, and without the presence of crosstalk interference.
Figure 12:
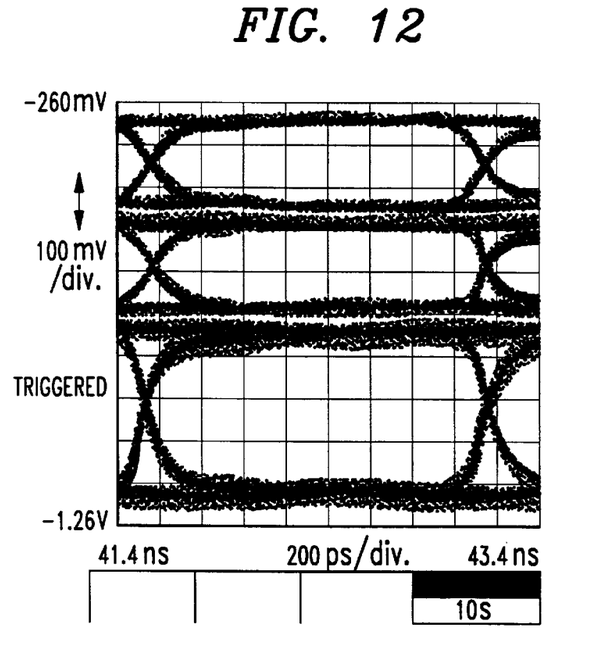
FIG. 12 is a graph representing an oscilloscope screen output generated by the third test configuration of FIG. 10 using the pin connection of FIG. 4, and with the presence of crosstalk interference.

Referring now to FIG. 10, the test configuration of Example 3 was similar to that of Example 1 except that a mismatched driver condition was provided by changing the driver end impedance on the data signal path 41 to 157 ohms. FIG. 11 shows the receiver end eye-diagram for the data signal path 41 with no interfering (crosstalk) signal presented on the adjacent interference signal path 61. It is somewhat degraded from the signal of FIG. 6. FIG. 12 shows the receiver end eye-diagram for the data signal path 41 with the interfering signal presented on the adjacent interference signal path 61. As can be seen, there is significant eye closure indicating degradation of the data signal, and this degradation is substantially worse than the corresponding signal degradation in FIG. 7 of Example 1.

Staggered Pin Experiments

The second group of experiments was with a METRAL™ connector PWB that carried the differential mode data and interference signal paths 41 and 61 through staggered pins, as shown in FIG. 4A. The effective driver end impedance on the data signal path 41 was varied with two different test configurations, as will now be described relative to Examples 4 and 5:

EXAMPLE 4

Figure 13:
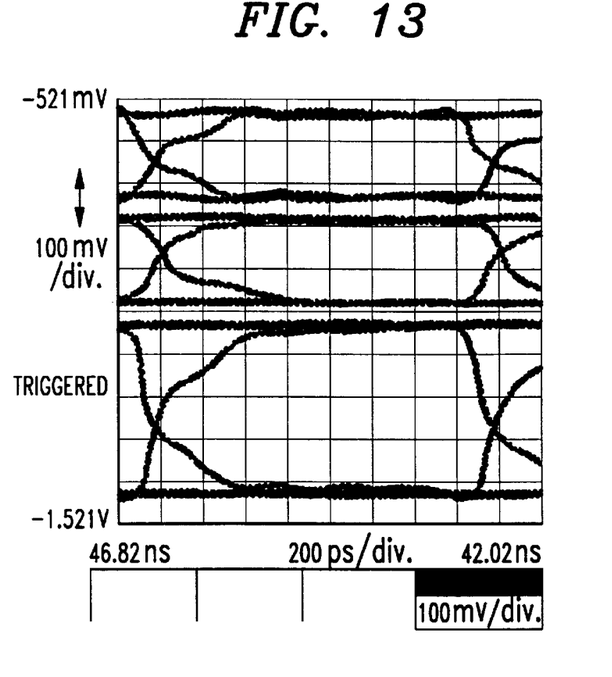
FIG. 13 is a graph representing an oscilloscope screen output generated by the first test configuration of FIG. 5 using the pin connection of FIG. 4A, and without the presence of crosstalk interference.
Figure 14:
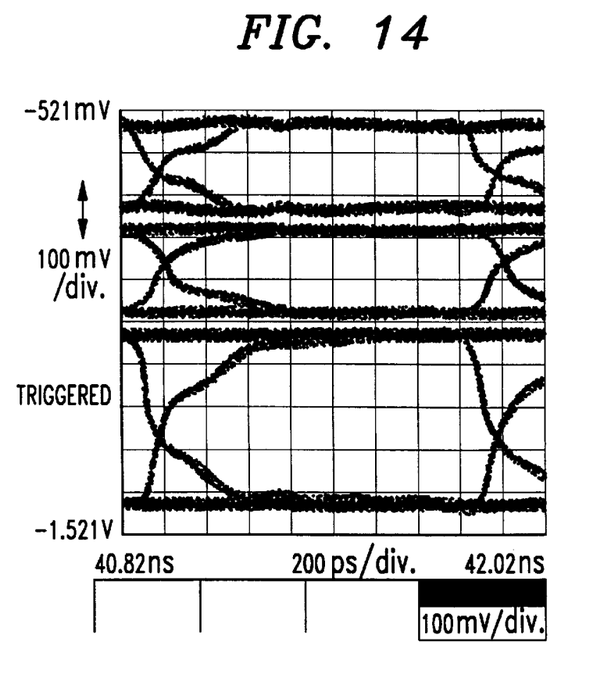
FIG. 14 is a graph representing an oscilloscope screen output generated by the first test configuration of FIG. 5 using the pin connection of FIG. 4A, and with the presence of crosstalk interference.

Example 4 utilized the test configuration of FIG. 5 in which there was a matched driver condition on the data signal path 41. The wire pairs 48/49 (and 50/51) of the data signal path 41, and the wire pairs 64/65 of the interference signal path 61, were attached to the connector PWB to provide a staggered pin pair relationship at A–A' and B–B' (as shown in FIG. 4A). FIG. 13 shows the receiver end eye-diagram for the data signal path 41 with no interfering (crosstalk) signal presented on the adjacent interference signal path 61. It will be seen that the received data signal is somewhat degraded from the eye-diagram in FIG. 6 of Example 1. FIG. 14 shows the receiver end eye-diagram for the data signal path 41 with the interfering signal presented on the adjacent interference signal path 61. As can be seen, there is only a slight degradation in the data signal relative to FIG. 13 wherein no interference is present.

EXAMPLE 5

Figure 15:
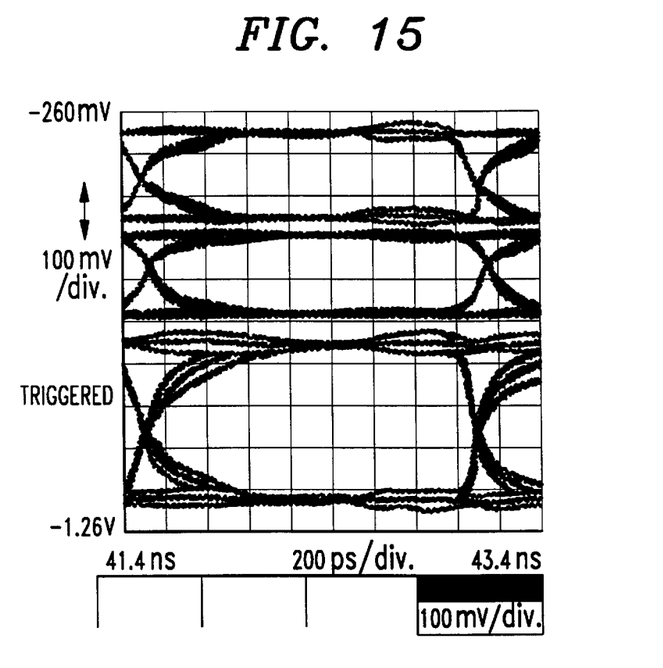
FIG. 15 is a graph representing an oscilloscope screen output generated by the third test configuration of FIG. 10 using the pin connection of FIG. 4A, and without the presence of crosstalk interference.
Figure 16:
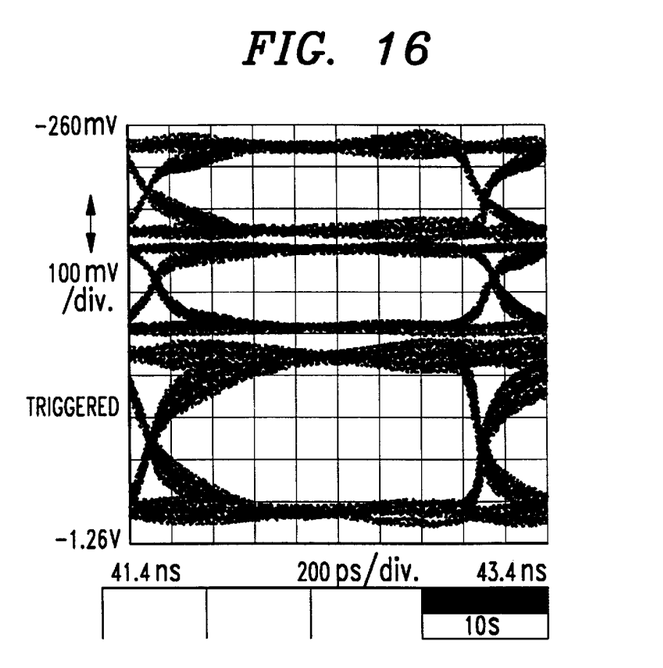
FIG. 16 is a graph representing an oscilloscope screen output generated by the third test configuration of FIG. 10 using the pin connection of FIG. 4A, and with the presence of crosstalk interference.

Example 5 utilized the test configuration of FIG. 10 in which there was an unmatched driver condition on the data signal path 41. FIG. 15 shows the resulting receiver end eye-diagram for the data signal path 41 without the crosstalk signal. As can be seen, there is significant eye closure indicating that the data signal has been seriously degraded. FIG. 16 shows the resulting receiver end eye-diagram for the data signal path 41 with the interfering (crosstalk) signal applied on the adjacent interference signal path 61. As can be seen, the eye-diagram has closed significantly and the received data signal has degraded.

Results Analysis

The foregoing examples demonstrate that there is a significant difference in the magnitude of connector crosstalk interference experienced at the receiver end of the data signal path 41 depending on the direction of the signals travelling through adjacent pin pairs of the connector PWB (compare FIG. 7 to FIG. 9), even with impedance matching. When adjacent signal pin pairs pass signals in the same direction and matched driver end (source) impedance and matched receiver end (termination) impedance are provided, crosstalk interference can be minimized at the receiver end. The benefit of the orthogonally adjacent pin connection arrangement is estimated to be a factor of three reduction in connector crosstalk. The staggered pin connection arrangement produced somewhat less crosstalk reduction; however, this result is believed to be based on a measurement limitation due to the lower inherent pin coupling for this case.

It is postulated that the reduction in receiver end crosstalk interference as a result of driver end impedance matching and same-direction connector pin configuring is due to the directional nature of the interference coupling during high speed digital signalling. More specifically, the interference signal is believed to couple into the data signal path 41 in a direction that is opposite to the direction of the interference signal travelling in the interference signal path 61. Thus, when the interference signal passes through the connector PWB in the same direction as the data signal carried on adjacent pin pairs, the interference signal couples into the data signal path 41 in a direction that is toward the driver end, producing reverse crosstalk. The driver end attenuator/ impedance matching circuit 44 absorbs the reverse crosstalk. Without the driver end impedance matching, the reverse crosstalk signal tends to reflect from the driver end and propagate to the receiver end.

It will be further observed that the test configurations of FIGS. 5, 8 and 10 effectively implement impedance matching by virtue of the resister 66 placed at the terminating end of the interference signal path 61. This absorbs the incident interference signal and prevents it from reflecting and propagating back toward the driver end, where it could become a source of interference to the adjacent pin signals. This reflected interference signal would tend to couple into the data signal path 41 as a forward crosstalk signal that propagates toward the receiver end of the data signal path 41. For this reason, it is concluded that impedance matching should be employed at both the driver and receiver ends of each data signal path that travels through a single header/ receptacle connector.

The foregoing conclusions are based on the inventors' belief that the adjacent connector pins in a high speed digital signalling connector, as disclosed herein, behave like microwave directional couplers. Thus, microwave solutions have been brought to bear on the problem. Namely, in the microwave art, it is common to employ impedance matching at both ends of an input line and an adjacent coupled line. Unwanted reflections resulting from the cross-coupling between lines are thus eliminated.

Accordingly, a high density, high speed digital signal connection interface with reduced cross talk has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

What is claimed is:

1. In a digital communication system having a pair of digital signal processing units, a high speed connection interface for providing bi-directional digital signal communications between said signal processing units, comprising:

a multiple pin connector including disconnectable header and receptacle portions;

a first set of signal-carrying wire pairs providing communication between said header and one of said signal processing units;

a second set of signal-carrying wire pairs providing communication between said receptacle and the other of said signal processing units;

said first and second wire pair sets each including a first wire pair subset carrying digital signals in a first direction between said signal processing units and a second wire pair subset carrying digital signals in a second direction between said signal processing units which is opposite to said first direction;

said first and second wire pair sets being attached to said connector such that adjacent signal-carrying pin pairs of said connector carry only digital signals travelling in the same direction, and such that connector pin pairs carrying digital signals travelling in opposite directions are not adjacent to each other; and a pair of impedance matching units each of which is associated with a respective one of said signal processing units, each impedance matching unit including an impedance matching circuit for each of the wire pairs in one of said wire pair sets, and each impedance matching circuit having a first side connected to a respective one of said signal processing units and a second side connected to one of said wire pairs at an impedance that substantially matches the wire pair impedance.

2. A digital communication system in accordance with claim 1 wherein there are no grounded or unconnected pins between connector pin pairs carrying signals in the same direction.

3. A digital communication system in accordance with claim 1 wherein said first and second wire pair sets are attached to said connector such that there are first and second groups of adjacent connector pin pairs corresponding to said first and second wire pair subsets.

4. A digital communication system in accordance with claim 1 wherein said first and second wire pair sets are attached to said connector such that there are first and second groups of adjacent connector pin pairs corresponding to said first and second wire pair subsets, and wherein said first and second connector pin pair groups are separated from each other by at least one row or column of pins group isolators.

5. A digital communication system in accordance with claim 1 wherein said wire pairs include any combination of twisted pair wiring, coaxial cables or circuit board traces, including a common ground plane constituting one of the wires of each wire pair for common mode digital signal transmissions.

6. A digital communication system in accordance with claim 1 wherein said high speed connection interface is adapted to carry either balanced differential mode or common mode transmission signal communications.

7. A digital communication system in accordance with claim 1 wherein said high speed connection interface is adapted to carry low voltage differential signal (LVDS) communications.

8. A digital communication system in accordance with claim 1 wherein said high speed connection interface is adapted to carry digital signals at speeds of up to at least approximately 622 Mbits/second.

9. A digital communication system in accordance with claim 1 wherein said wire pairs have a characteristic impedance of approximately 50 ohms.

10. A digital communication system in accordance with claim 1 wherein said connector is configured for connecting a digital circuit board to a backplane signal interconnector.

11. A digital communication method for reducing cross talk in a high speed, high density connection interface between a pair of digital signal processing units, comprising the steps of:

controlling said signal processing units to transmit digital data signals to be carried on connection paths formed by wire pair sets that respectively communicate with header and receptacle portions of a multiple pin connector, each wire pair of said wire pair sets carrying a single data signal in a single direction from a driver end to a receiver end of one of said connection paths;

impedance matching said digital signals to the wire pairs of said wire pair sets at said driver end and said receiver end of each connection path; and exchanging said digital signals between said wire pairs sets through the pins of said connector such that adjacent signal carrying pin pairs of said connector carry only signals travelling in the same direction, and such that connector pin pairs carrying digital signals travelling in opposite directions are not adjacent to each other.

12. A digital communication method in accordance with claim 11 wherein said signal exchange step includes exchanging said digital signals between said wire pair sets with no grounded or unconnected pins between connector pin pairs carrying signals in the same direction.

13. A digital communication method in accordance with claim 11 wherein said signal exchange step includes exchanging said digital signals between said wire pair sets with first and second groups of adjacent connector pin pairs respectively carrying all of the digital signals travelling in one direction between said digital signal processing units.

14. A digital communication method in accordance with claim 11 wherein said exchange step includes exchanging said digital signals between said wire pair sets with first and second groups of adjacent connector pin pairs respectively carrying all of the digital signals travelling in one direction between said digital signal processing units, and with said first and second connector pin pair groups being separated from each other by at least one row or column of pin group isolators.

15. A digital communication method in accordance with claim 11 wherein said wire pairs include any combination of twisted pair wiring, coaxial cables or circuit board traces, including a common ground plane constituting one of the wires of each wire pair for common mode digital signal transmissions.

16. A digital communication method in accordance with claim 11 wherein said controlling step includes controlling said signal processing units to transmit either differential mode or common mode transmission signals.

17. A digital communication method in accordance with claim 11 wherein said controlling step includes controlling said signal processing units to transmit low voltage differential signals (LVDS).

18. A digital communication method in accordance with claim 11 wherein said controlling step includes controlling said signal processing units to transmit digital signals at speeds of at least approximately 622 Mbits/second.

19. A digital communication method in accordance with claim 11 wherein said wire pairs have a characteristic impedance of approximately 50 ohms.

20. A digital communication method in accordance with claim 11 wherein said exchange step includes exchanging said digital signals between said wire pair sets using a connector that connects a digital circuit board to a backplane signal interconnector.

21. A digital communication system, comprising:

a first digital signal processing unit;

a second digital signal processing unit;

a multiple pin connector including disconnectable header and receptacle portions;

a first set of signal-carrying wire pairs providing communication between said header and one of said signal processing units;

a second set of signal-carrying wire pairs providing communication between said receptacle and the other of said signal processing units;

said first and second wire pair sets carrying bi-directional digital signals between said signal processing units and being attached to said connector such that there are two groups of adjacent connector pin pairs carrying only signals travelling in the same direction, and such that said connector pin pair groups are separated from each other;

a pair of impedance matching units each having impedance matching circuits for each of the wire pairs of a respective one of said wire pair sets, each impedance matching circuit having a first side connected to a respective one of said signal processing units and a second side connected to one of said wire pairs at an impedance that substantially matches the wire pair impedance;

said digital communication system being adapted to carry digital signals at speeds of up to at least approximately 622 Mbits/second; and said connector being configured for connecting a digital circuit board to a backplane signal interconnector.

\* \* \* \* \*